United States Patent [19]
Robertson

[11] 3,829,543
[45] Aug. 13, 1974

[54] MELT SPINNING OF POLYMERS

[75] Inventor: William Neil Robertson, Harrogate, England

[73] Assignee: Imperial Chemical Industries Limited, Millbank, London, Great Britain

[22] Filed: July 14, 1972

[21] Appl. No.: 271,949

[52] U.S. Cl.................. 264/78, 57/140 B, 260/37, 260/40, 260/41, 264/176 F, 264/211
[51] Int. Cl. ............................................. D01f 1/04
[58] Field of Search.......... 264/176 F, 211, 171, 78; 57/140 B; 260/37, 40, 41

[56] References Cited
UNITED STATES PATENTS

| | | | |
|---|---|---|---|
| 3,209,402 | 10/1965 | Riley et al............................ | 264/171 |
| 3,593,513 | 7/1971 | Reese.................................... | 57/140 |
| 3,671,620 | 6/1972 | Inoue................................... | 264/171 |
| 3,701,819 | 10/1972 | Yoshida et al....................... | 264/168 |

*Primary Examiner*—Jay H. Woo
*Attorney, Agent, or Firm*—Thomas J. Morgan; Roderick B. Macleod; Stephen D. Morgan

[57] ABSTRACT

Manufacture of at least two filaments or groups of filaments by melt-spinning thermoplastic polymer with incorporation of different colouring material wherein molecular weight is adjusted additively to reduction caused by colouring material to give same molecular weight of polymer in filaments.

4 Claims, No Drawings

MELT SPINNING OF POLYMERS

The present invention relates to the melt-spinning of a fibre-forming polymer in the presence of a colouring material with adjustment of the molecular weight of the polymer to a predetermined value.

In the melt-spinning of filaments, it is often convenient to incorporate colouring material into the polymer melt before extrusion to produce ready coloured filaments. In some cases the colouring material chosen may be sufficiently stable under the normally high temperature conditions used for the melt-spinning, in other cases the colouring material chosen may be less stable. In the latter case, use may be made of the process which is the subject of our copending Great Britain Application No. 33639/70, according to which the time of exposure of the colouring material during incorporation into the polymer and while the resultant mixture is being formed into filaments is minimized. The decomposition of a proportion of the colouring material is also accompanied by reaction with the polymer whereby linkages in the polymer chain are severed, with consequent reduction in average molecular weight. The extent of the reduction in average molecular weight depends on the chemical nature of the colouring material and the proportion of it incorporated into the polymer, taken together with the temperature to which the mixture is subjected and the duration of this subjection. It will be seen therefore that in manufacturing a range of filaments of a variety of colours in which the individual types of filament differ in type of colouring material or proportion of it incorporated, or both, the extent of the reduction in average molecular weight will differ between the filaments. This will result in differing physical properties between the differently coloured filaments, for example difference in birefringence.

It is known from U.K. Specification No. 986,619 in the manufacture of filaments from polyesters, to add to the polyester a decomposing agent in quantity such as to reduce the specific viscosity by 0.2 to 0.5 units as compared with the starting polyester.

According to the present invention we provide a process for the manufacture of at least two filaments, or two groups of filaments, each of which is differently coloured, comprised of polymer of the same predetermined average molecular weight, from fibre-forming polymer of a single average molecular weight, by a melt-spinning process comprising addition to the polymer with mixing of a proportion of colouring material immediately prior to the melt-spinning, said colouring material also during the melt-spinning process producing incidental reduction in the average molecular weight of the polymer, wherein at least first and second portions of polymer are separately melt-spun to form at least first and second filaments, or groups of filaments, the colouring material added to each portion of polymer being different in composition and/or proportion and there being added to at least all but one of the portions of polymer prior to melt-spinning a proportion of a non-coloured additive which under the conditions to which the polymer is thereafter subjected effects a change in the average molecular weight of the polymer whereby the polymer comprising each of the differently coloured filaments, or each of the groups of filaments, is adjusted to be of the same average molecular weight.

As polymers suitable for use in the process of our invention there may be mentioned polyesters, polyamides and polyolefines. Examples of colouring materials according to our invention are colouring materials having a degradative effect at the temperature used in melt-spinning, that is reduction in molecular weight. In the case of a polyester as the fibre-forming polymer, examples of such colouring materials are azo compounds which exist as disperse dyes as listed in the Color Index. Example of azo compounds falling within this class are Cl Disperse Red 72, Cl Disperse Orange 30, Cl Disperse Red 54, Cl Disperse Red 74, Cl Disperse Red 167, Cl Disperse Blue 79, Cl Disperse Yellow 42, Cl Disperse Brown 4, Cl Disperse Blue 219, Cl Disperse Red 131, Cl Disperse Orange 13, Cl Disperse Violet 33, Cl Disperse Red 65 and Cl Disperse Blue 122.

In the case of the use of a polyester as the fibre-forming polymer, and in the case wherein the average molecular weight is lowered by the action of the non-coloured additive, examples of suitable additives are mono- or di-carboxylic acids, monohydric alcohols, glycols, alkyl esters of monocarboxylic acids, alkyl esters or dicarboxylic acids wherein alkyl is of one to four carbon atoms, diphenyl esters of monocarboxylic acids, diphenyl esters of dicarboxylic acids, bis($\omega$-hydroxyalkyl) dicarboxylates and low molecular weight polyesters of up to four structural units. The non-coloured additive may be a mixture of reactive compounds effecting reduction in average molecular weight, for example the product of the reaction of terephthalic acid with ethylene glycol, using a molecular ratio of, for example 1.05 to 1 to 3 to 1 glycol to acid.

In the case of the use of a polyester and in which the average molecular weight is raised, examples of suitable additives are dicarboxylic acid anhydrides and di-isocyanates.

In order to establish the necessary proportion of the non-coloured additive to ensure the required result, it is necessary to carry out simple trial of the incorporation one at a time in polymer of a single average molecular weight of each particular colouring material to be used, at the proportion to be used and under the conditions of temperature and time appropriate for the melt-spinning. This will show the magnitude of the fall in average molecular weight of the polymer in forming the filament for each colouring material at the proportion used. From several observations at different proportions of each colouring material, the effect for any required proportion of any of the colouring materials can be forecast. It will then be possible to decide, in the case of a non-coloured additive producing molecular weight reduction, the minimum acceptable average molecular weight for the starting polymer so that even for the highest required proportion of the colouring material which is most effective in bringing about reduction in the average molecular weight of the polymer the final average molecular weight of the polymer of the filament is no lower than the predetermined value.

Next the effectiveness of the non-coloured additive in lowering the average molecular weight of the polymer is tested under the same conditions as for the colouring material. It is possible then to calculate the proportion of the non-coloured material, if any, to be incorporated into the polymer before the melt-spinning process in order to produce the corresponding further reduction in average molecular weight appropriate for any particular proportion of any particular colouring material so that the final average molecular weight of the polymer comprising the filaments is in each case the same, and of the predetermined level.

In the case of a non-coloured additive which produces increase in average molecular weight of the polymer, it is, of course, necessary to choose the initial average molecular weight so that the reduction produced by the colouring material lowers the average molecular weight below the predetermined final value, so the non-coloured additive may effect increase in molecular weight to the required final value.

According to a further feature of our invention, during melt-spinning of the filament, or group of filaments, coloured with a particular colouring material, and with incorporation of non-coloured additive, observation is made at a point immediately prior to extrusion of some parameter having direct relationship to the average molecular weight of the polymer, and if required the proportion of non-coloured additive is adjusted in accordance with the observation so as to ensure the production of the predetermined average molecular weight. An appropriate parameter which may be observed at a point immediately prior to extrusion is the melt viscosity. Observation of the melt viscosity may, for example, involve measurement of the torque required to rotate a member in the melt, or measurement of the pressure drop across the spinneret. Appropriate correction will, of course, be applied for the temperature of the melt. Suitable calibration of the method used will merely involve actual measurement of the average molecular weight of the filament produced and comparison with observed values.

The proportion of colouring material which may be incorporated into the fibre-forming polymer according to our invention may usefully be from 0.01 to 2.5 percent by weight, based on the weight of polymer. The proportion of the non-coloured additive incorporated depends, as already stated, on the proportion and type of coloured material and the temperature of the melt and the time for which the melt is exposed to that temperature, and may usefully be from 0.1 to 1.5 percent by weight based on the fibre-forming polymer. In the case of poly(ethylene terephthalate) as fibre-forming polymer, this corresponds to 0.00077 molecules of additive per repeat unit to 0.0117 molecules of additive per repeat unit.

The colouring material added to the polymer may be a single colouring material or a mixture of colouring materials.

Other substances commonly present in melt-spun filaments may be present in the filaments of the present invention and may be incorporated at any appropriate stage. Examples of such substances are delustrants, stabilizers, optical brighteners and colouring materials which do not have the effect of producing reduction in the average molecular weight of the polymer.

The colouring material and non-coloured additive may be added by any appropriate method. The most convenient method is the formation of each into pellets of uniform weight so that the feeding of a uniform rate of pellets results in the feeding of a known weight feed rate of each. The pellets of the colouring material and non-coloured additive may be fed together or separately. In place of pellets any other form of discrete portions may be used, for example an encapsulated loose powder. In appropriate cases, at least a proportion of the non-coloured additive may be incorporated with the colouring material to form a single type of composite pellet. The pellets of the colouring material and non-coloured additive may be mixed with the granules of the polymer and the mixture subsequently melted and mixed, or the pellets of each may be added to the polymer melt. Preferably the duration of contact of the colouring material with the polymer melt should be minimized and mixing should be effected rapidly in order to give reproducible results. Examples of suitable methods are the use of a screw extruder-melter, and in such case it is preferable that the pellets of each type fall into an unfilled flight of the extruder screw and are followed by the thermoplastic polymer granules thus ensuring that there is no segregation of the added material, and the addition to the polymer granule feed or the melt pool of a melt grid or pressure melter. In the case of a polymer manufacturing process resulting in a molten polymer product, and in which direct melt spinning of this melt is contemplated, the colouring material and non-coloured additive may be added to the melt with appropriate mixing means. In such a process the further feature of our invention has particular benefits in that characteristics of the polymer molecular weight is not so precise as when solid polymer can be tested, and correction may readily be made by observation of a parameter of the polymer melt plus additives immediately prior to extrusion and alteration of the proportion of the second additive to produce the desired result. Thereafter the conditions thus established may possibly be adhered to without further change other than, for example, when change is made to a different colouring material.

In order that the process of our invention may the more easily be understood, we give hereinafter examples of methods in which it may be operated.

EXAMPLE 1

Poly(ethylene terephthalate) was prepared by the reaction of dimethyl terephthalate using calcium acetate as catalyst, addition of phosphorous acid as stabilizer and polycondensation in the presence of antimony trioxide. The intrinsic viscosity, as determined in ortho chlorophenol solution at 25°C was 0.65 decilitres per g. Pellets of a mixture of three dyes in the proportions: Cl Disperse Blue 79 (78 parts by weight), Cl Disperse Orange 30 (9 parts by weight) and Cl Disperse Red 72 (8 parts by weight), were prepared, of uniform weight. The poly(ethylene terephthalate) chips were melted in a screw extruder and the pellets of the mixed dyes metered into an empty flight at such a numerical rate as to correspond to 0.43 percent by weight based on the polyester. Mixing took place and the mixed melt was subjected to melt spinning to form a melt dyed yarn. The temperature of the melt in the spinning process was 269°C. The total residence time of the colouring material in intimate contact with the polyester was 3 minutes. The intrinsic viscosity of the yarn was found to be 0.59. While continuing the same feed rates of poly(ethylene terephthalate) chips and mixed dye pellets, pellets of bis($\beta$-hydroxyethyl) terephthalate of uniform weight were fed in with the chip feed at such a rate as to correspond to 0.55 percent by weight based on the polyester. The resultant yarn then had intrinsic viscosity 0.47, that is the desired level.

EXAMPLE 2

Example 1 was repeated with the distinction that in place of the pellets of three dyes, there were used pellets of two dyes in the proportion: C1 Disperse Blue 79 (78 parts by weight), C1 Disperse Red 72 (22 parts by weight). These pellets were of the same uniform weight as for the three dye pellets and were metered into poly-(ethylene terephthalate) of the same intrinsic viscosity as in Example 1 being melted and extruded to form yarn as in Example 1, at 2.3 percent by weight on polyester. The intrinsic viscosity of the yarn was found to be 0.52. While continuing the same feed rates of poly(ethylene terephthalate) chips and mixed dye pellets, pellets of bis($\beta$-hydroxethyl) terephthalate of uniform weight were fed in with the chip feed at such a rate as to correspond to 0.16 percent by weight based on the polyester. The resultant yarn then had intrinsic viscosity 0.47, that is the desired level and the same level as that of the yarn finally obtained in Example 1.

EXAMPLE 3

Example 1 was repeated with the distinctions that the polyester intrinsic viscosity was 0.485 and that the three dye mixture pellets were metered in at a rate corresponding to 0.025 percent by weight based on the polyester. The resultant melt dyed yarn was found to have intrinsic viscosity of 0.47. Continuing the same rate of throughput of poly(ethylene terephthalate), a change was made from the three dye pellets to pellets containing the three dye mixture in the same proportions but containing additionally bis($\beta$-hydroxyethyl) terephthalate in the proportion of one part by weight of dye mixture to 24 parts by weight of bis($\beta$-hydroxyethyl) terephthalate. These pellets were metered into the polyester chip feed at a rate corresponding to 0.025 percent by weight of the three dye mixture. The yarn was found to have intrinsic viscosity 0.40.

EXAMPLE 4

Example 1 was repeated with the distinction that the polyester IV was 0.485. The resultant melt dyed yarn has intrinsic viscosity 0.46. Continuing the same rate of throughput of poly(ethylene terephthalate), and three dye pellet feed, an additional feed of pellets of bis($\beta$-hydroxyethyl) terephthalate was started and continued at a rate corresponding to a weight percentage of 0.5 percent on polyester. The yarn was found to have intrinsic viscosity 0.40, that is the desired level and the same level as that of the yarn finally obtained in Example 3.

EXAMPLE 5

(a) Poly(ethylene terephthalate) was prepared according to Example 1, but of intrinsic viscosity 0.67. Pellets of a mixture of three dyes in the proportions: CI Disperse Blue 79 (28.4 parts), CI Disperse Orange 30 (65 parts) and CI Disperse Red 72 (6.6 parts), were prepared, of uniform weight. The poly(ethylene terephthalate) chips were melted in an extruder and the pellets of mixed dyes metered in as described in Example 1, but at a numerical rate corresponding to 0.34 percent by weight. Mixing and melt-spinning was carried out as described in Example 1. The intrinsic viscosity of the yarn was found to be 0.62.

(b) Terephthalic acid was reacted with ethylene glycol in the ratio 2:1 glycol to acid at a temperature of 230° – 240°C under such conditions that water of reaction was eliminated but no glycol was lost by volatilisation. The product is hereinafter referred to as "monomer."

Pellets of a mixture of three dyes and "monomer" in the proportions: CI Disperse Blue 79 (8.5 parts), CI Disperse Orange 30 (19.5 parts), CI Disperse Red 72 (2 parts) and "monomer" (70 parts), were prepared, of uniform weight. Poly(ethylene terephthalate) chips according to the present Example 5 were melted in an extruder and the pellets of mixed dyes and "monomer" metered in as described in Example 1, but at a numerical rate corresponding to 1.12 percent by weight. This rate corresponds to a rate for the three dyes only, of 0.34 percent by weight, as in the first part of the present Example 5. Mixing and melt-spinning was carried out as described in Example 1. The intrinsic viscosity of the yarn was found to be 0.474.

EXAMPLE 6

(a) Example 5(a) was repeated, with the exceptions that the proportions of the three dyes in the pellets were: CI Disperse Blue 79 (21.5 parts), CI Disperse Orange 30 (66.25 parts) and CI Disperse Red (12.25 parts), and the numerical rate of addition of pellets corresponded to 2.1 percent. Mixing and melt-spinning was carried out as described in Example 1. The intrinsic viscosity of the yarn was found to be 0.55.

(b) Example 5(b) was repeated with the exceptions that the pellets of the three dyes and the "monomer" were in the following proportions: CI Disperse Blue 79 (17.5 parts), CI Disperse Orange 30 (54 parts), CI Disperse Red 72 (10 parts) and "monomer" (18.5 parts), and the numerical rate of addition of pellets corresponded to 2.58 percent. The intrinsic viscosity of the yarn was found to be 0.475, that is practically the same intrinsic viscosity as the yarn of Example 5 (b).

In the foregoing examples the pellets used were obtained by normal tabletting methods.

In Example 5, the products from 5(a) and 5(b) were of identical shade.

In Example 6, the products from 6(a) and 6(b) were also of identical shade.

What we claim is:

1. A process for the manufacture of at least two groups of polyester filaments, each group being differently colored and comprising polymer having substantially the same predetermined average molecular weight, by a process in which each group is prepared by separate melt-spinning of portions of polymer having the same average molecular weight and at least one portion further comprises a coloring material that reduces the average molecular weight of the polymer during melt spinning, which comprises:
   adding to at least all but one of said portions of polymer prior to melt-spinning a proportion of a non-colored additive in an amount that reduces the average molecular weight of each said portion to said substantially the same predetermined average molecular weight.

2. A process according to either of claim 1 wherein said coloring material is an azo compound which is a disperse dye as listed in the Color Index.

3. A process according to either of claim 2 wherein said coloring material is C1 Disperse Red 72, C1 Disperse Orange 30, C1 Disperse Red 54, C1 Disperse Red 74, C1 Disperse Red 167, C1 Disperse Blue 79, C1 Disperse Yellow 42, Cl Disperse Brown 4, Cl Disperse Blue 219, Cl Disperse Red 131, Cl Disperse Orange 13, Cl Disperse Violet 33, Cl Disperse Red 65 or Cl Disperse Blue 122.

4. A process according to claim 1 wherein the non-colored additive is a glycol, a monohydric alcohol, a glycol, a monocarboxylic acid, a dicarboxylic acid, the dialkyl ester of a dicarboxylic acid wherein alkyl is of from one to four carbon atoms, a diphenyl ester of a mono or a dicarboxylic acid, a diglycol ester of a dicarboxylic acid or an oligomer of a polyester of up to four structural units.

* * * * *